US012696072B2

(12) United States Patent
Morsey et al.

(10) Patent No.: US 12,696,072 B2
(45) Date of Patent: Jul. 28, 2026

(54) GENERATING AND RELEASING OF RADIO ACCESS NETWORK INTELLIGENT CONTROLLER SUBSCRIPTION IDENTIFIERS

(71) Applicant: Dell Products L.P., Round Rock, TX (US)

(72) Inventors: Amr Morsey, New Cairo (EG); Mohamed Shaaban, New Cairo (EG); Yassin Chaddad, New Cairo (EG); Loay Elshall, Nasr (EG)

(73) Assignee: Dell Products L.P., Round Rock, TX (US)

( * ) Notice: Subject to any disclaimer, the term of this patent is extended or adjusted under 35 U.S.C. 154(b) by 418 days.

(21) Appl. No.: 18/340,169

(22) Filed: Jun. 23, 2023

(65) Prior Publication Data
US 2024/0430663 A1     Dec. 26, 2024

(51) Int. Cl.
*H04W 8/18*          (2009.01)
(52) U.S. Cl.
CPC .................................. *H04W 8/186* (2013.01)
(58) Field of Classification Search
None
See application file for complete search history.

(56) References Cited

U.S. PATENT DOCUMENTS 9,672,498 B2 *   6/2017   Nguyen Manh ....... G06Q 10/20
2011/0320604 A1 *  12/2011   Kulkarni ................ G06Q 10/06
                                                709/226

(Continued)

FOREIGN PATENT DOCUMENTS

CN        108 509 535 A     9/2018
CN          109033312 A  * 12/2018  ............. G06F 17/30
                    (Continued)

OTHER PUBLICATIONS

Dahlman, et al., "5G NR: The Next Generation Wireless Access Technology", Copyright © 2018 Elsevier Ltd., ISBN: 978-0-12-814323-0.

(Continued)

*Primary Examiner* — Wutchung Chu
*Assistant Examiner* — Berhanu D Belete
(74) *Attorney, Agent, or Firm* — Amin, Turocy & Watson, LLP

(57)          ABSTRACT

The technology described herein is directed towards maintaining an interval group data structure of one or more interval groups that each contain ranges of one or more available values such as subscription identifiers. The subscription identifiers can be used by a radio access network (RAN) intelligent controller (a near-real-time RIC) for xApp-to-E2 node subscriptions. When a subscription identifier is needed, a value from an interval group is selected and returned, and removed from the interval group as no longer being eligible for use, until released. This can be the lowest value in the lowest interval group. When a subscription identifier is released, the value is reinserted into the interval group data structure. This may be by modifying an existing interval group, or creating a new interval group for the released value. Reinsertion can result in two (or three) adjacent interval groups, which can be merged into a single interval group.

20 Claims, 14 Drawing Sheets

(56) References Cited

U.S. PATENT DOCUMENTS

| | | | | |
|---|---|---|---|---|
| 2014/0280317 A1* | 9/2014 | Sahni | .................... | G06F 16/958 |
| | | | | 707/769 |
| 2016/0232223 A1* | 8/2016 | Hopcraft | .............. | G06F 16/285 |
| 2016/0340057 A1* | 11/2016 | Nguyen Manh | ....... | G06Q 10/20 |
| 2017/0063946 A1* | 3/2017 | Quan | ...................... | H04L 67/55 |
| 2017/0244657 A1* | 8/2017 | Baldwin | .............. | H04L 51/212 |
| 2018/0324585 A1* | 11/2018 | Nair | .................... | H04L 63/0442 |
| 2019/0130496 A1* | 5/2019 | Aroli Veettil | .......... | G06Q 10/40 |
| 2019/0377547 A1* | 12/2019 | Kahn | .................. | G06F 16/2255 |
| 2020/0359212 A1* | 11/2020 | Chen | .................... | H04L 63/102 |
| 2020/0396310 A1* | 12/2020 | Soni | .................... | G06F 11/1464 |
| 2021/0058776 A1* | 2/2021 | Nair | ........................ | H04W 8/26 |
| 2021/0329339 A1* | 10/2021 | Largman | ............ | H04N 21/4438 |
| 2021/0385290 A1* | 12/2021 | Edamadaka | ......... | G06Q 10/103 |
| 2022/0225066 A1* | 7/2022 | Song | ....................... | H04W 4/12 |

FOREIGN PATENT DOCUMENTS

| | | | | |
|---|---|---|---|---|
| CN | 108 509 535 B | 12/2020 | | |
| WO | WO-2023023034 A1 * | 2/2023 | ........... | H04W 24/02 |

OTHER PUBLICATIONS

3GPP, "Study on New Radio (NR) Access Technology Physical Layer Aspects," 3GPP TR 38.802, (Release 15), V0.0.1, Jun. 9, 2016.

O-RAN Alliance, "O-RAN.WG1.O-RAN-Architecture-Description-v07.00", Oct. 2022.

International Search Report and Written Opinion mailed Mar. 15, 2024 for PCT Application No. PCT/US2023/036203, 49 pages.

Notification Concerning Transmittal of International Preliminary Report on Patentability mailed Jan. 2, 2026 for PCT Application No. PCT/US2023/036203, 13 pages.

European Office Action mailed Jan. 30, 2026 for European Patent Application No. 23813929.9, 3 pages.

* cited by examiner

730(1)

Interval Group Data Structure

*Release ID 8*

| 12 |

730(1)

Interval Group Data Structure

Interval Group Data Structure

FIG. 8 begin

Figure 8:
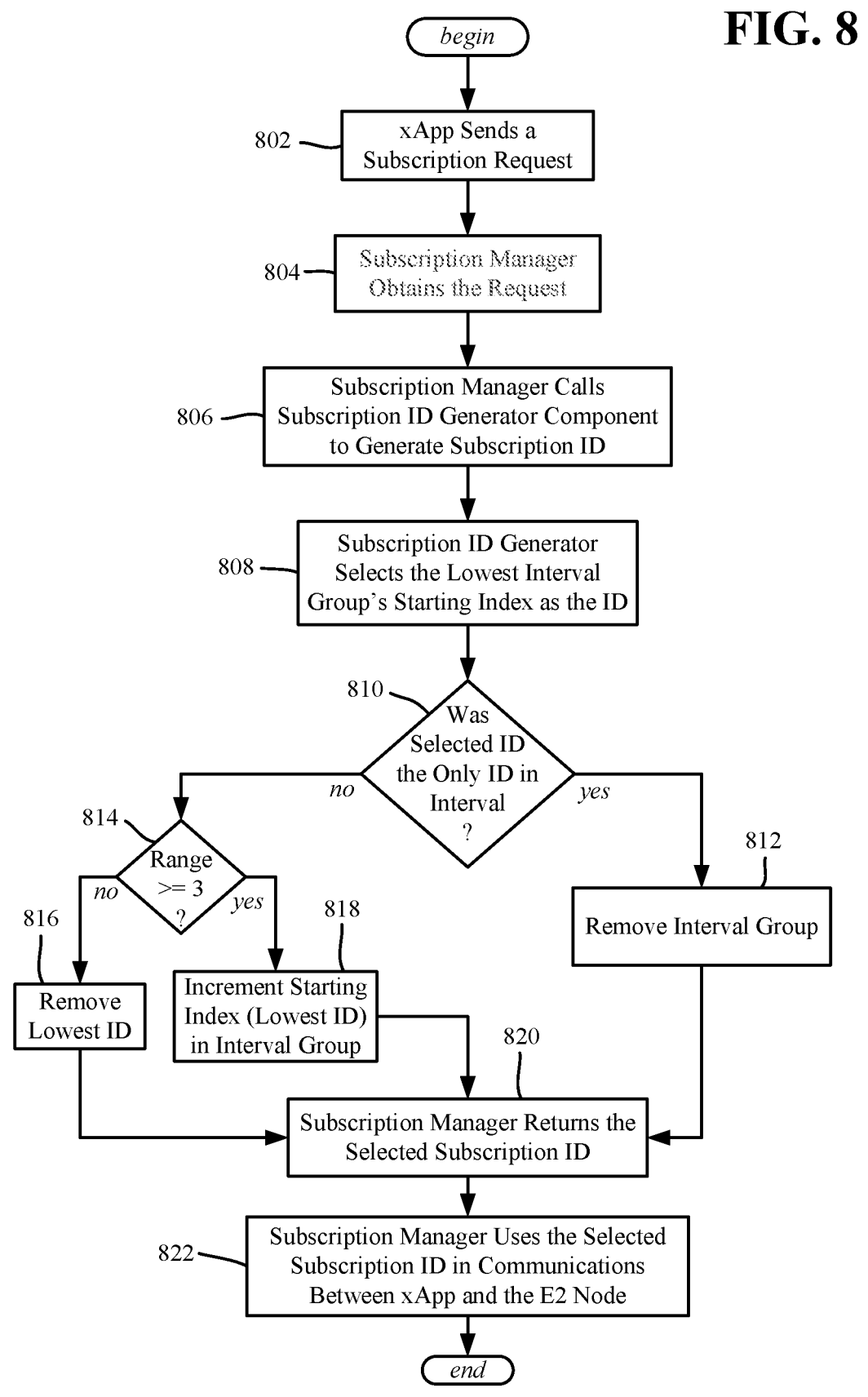

802 — xApp Sends a Subscription Request

804 — Subscription Manager Obtains the Request

806 — Subscription Manager Calls Subscription ID Generator Component to Generate Subscription ID 808 — Subscription ID Generator Selects the Lowest Interval Group's Starting Index as the ID 810 — Was Selected ID the Only ID in Interval ?

no yes

814 — Range >= 3 ?

no yes

812 — Remove Interval Group

816 — Remove Lowest ID

818 — Increment Starting Index (Lowest ID) in Interval Group

820 — Subscription Manager Returns the Selected Subscription ID

822 — Subscription Manager Uses the Selected Subscription ID in Communications Between xApp and the E2 Node end

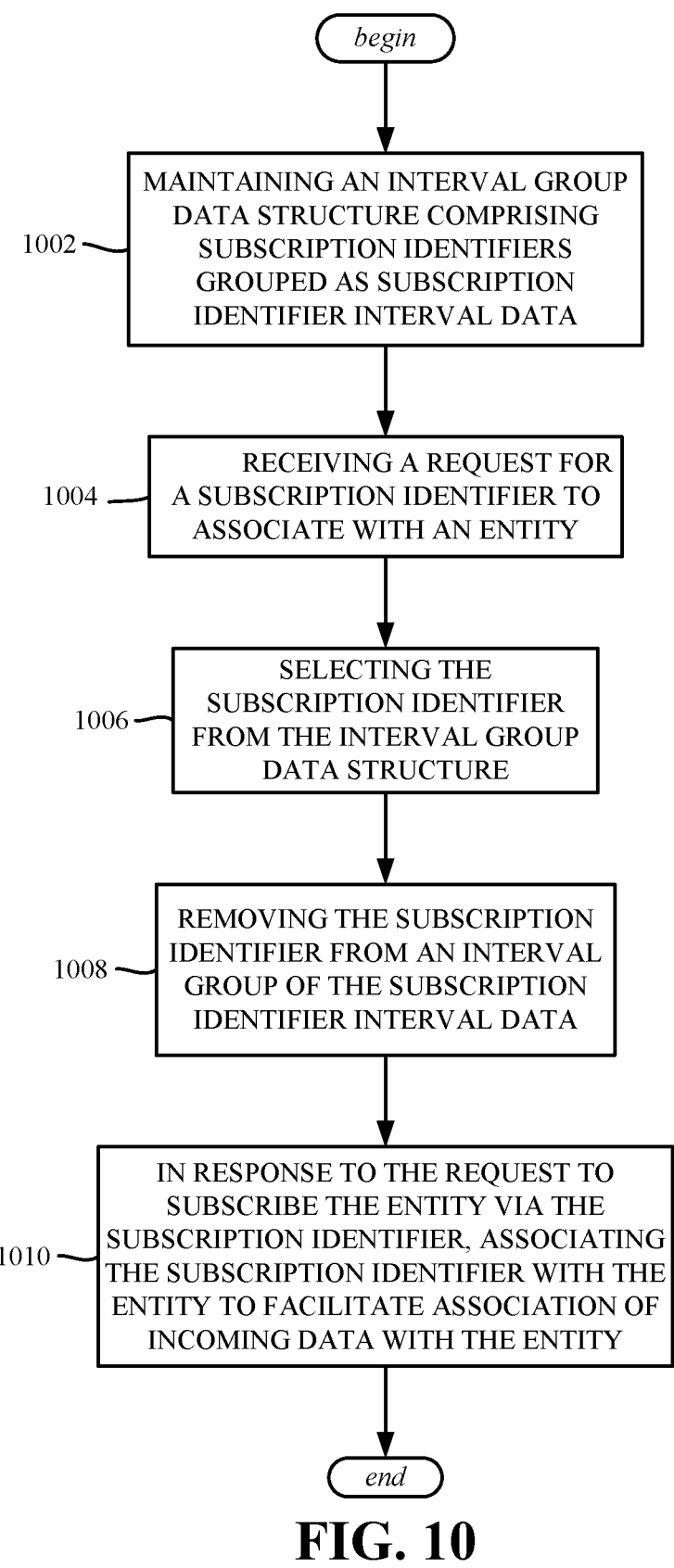

begin

1002 — MAINTAINING AN INTERVAL GROUP DATA STRUCTURE COMPRISING SUBSCRIPTION IDENTIFIERS GROUPED AS SUBSCRIPTION IDENTIFIER INTERVAL DATA

1004 — RECEIVING A REQUEST FOR A SUBSCRIPTION IDENTIFIER TO ASSOCIATE WITH AN ENTITY

1006 — SELECTING THE SUBSCRIPTION IDENTIFIER FROM THE INTERVAL GROUP DATA STRUCTURE

1008 — REMOVING THE SUBSCRIPTION IDENTIFIER FROM AN INTERVAL GROUP OF THE SUBSCRIPTION IDENTIFIER INTERVAL DATA

1010 — IN RESPONSE TO THE REQUEST TO SUBSCRIBE THE ENTITY VIA THE SUBSCRIPTION IDENTIFIER, ASSOCIATING THE SUBSCRIPTION IDENTIFIER WITH THE ENTITY TO FACILITATE ASSOCIATION OF INCOMING DATA WITH THE ENTITY end

FIG. 10

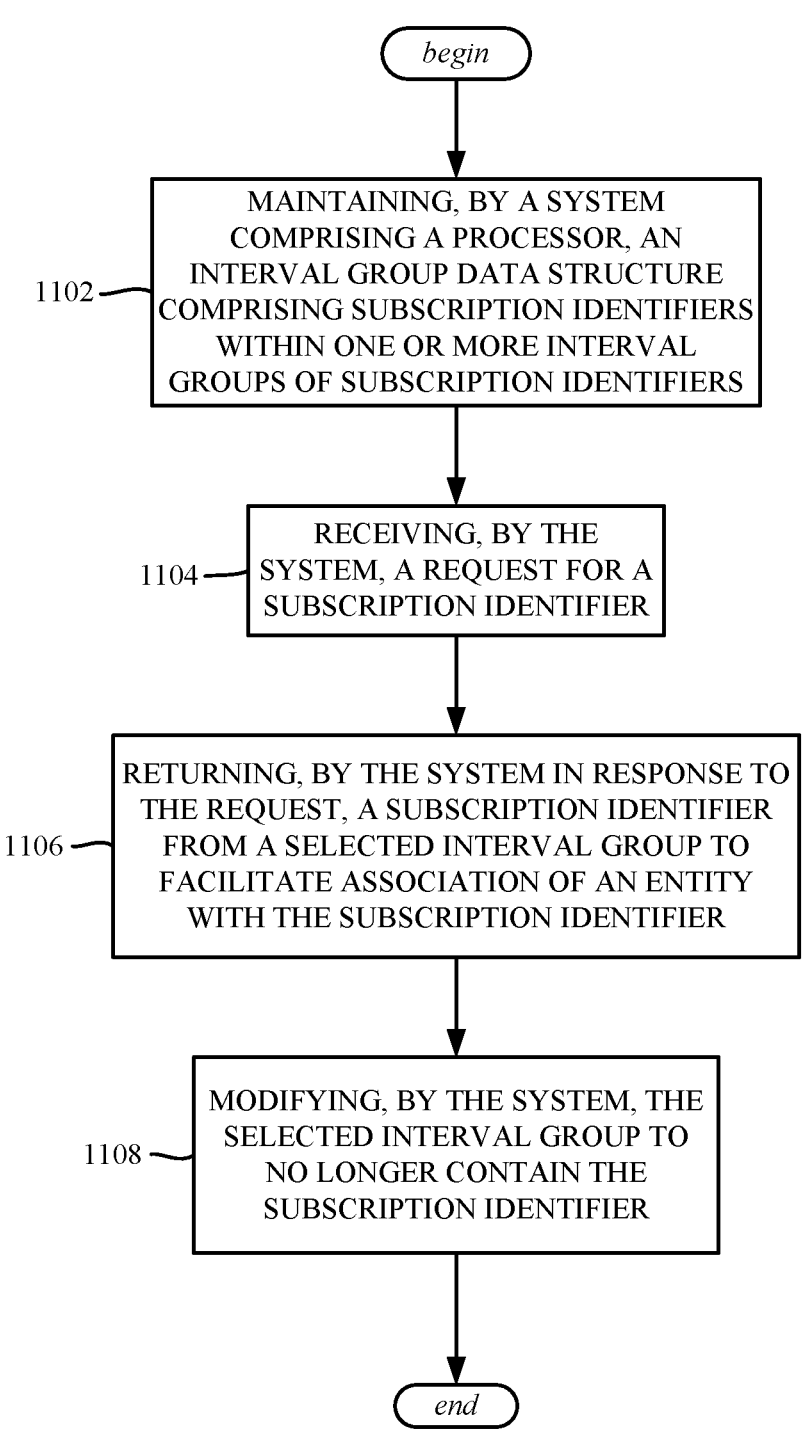

1102 — MAINTAINING, BY A SYSTEM COMPRISING A PROCESSOR, AN INTERVAL GROUP DATA STRUCTURE COMPRISING SUBSCRIPTION IDENTIFIERS WITHIN ONE OR MORE INTERVAL GROUPS OF SUBSCRIPTION IDENTIFIERS

1104 — RECEIVING, BY THE SYSTEM, A REQUEST FOR A SUBSCRIPTION IDENTIFIER

1106 — RETURNING, BY THE SYSTEM IN RESPONSE TO THE REQUEST, A SUBSCRIPTION IDENTIFIER FROM A SELECTED INTERVAL GROUP TO FACILITATE ASSOCIATION OF AN ENTITY WITH THE SUBSCRIPTION IDENTIFIER

1108 — MODIFYING, BY THE SYSTEM, THE SELECTED INTERVAL GROUP TO NO LONGER CONTAIN THE SUBSCRIPTION IDENTIFIER

FIG. 11

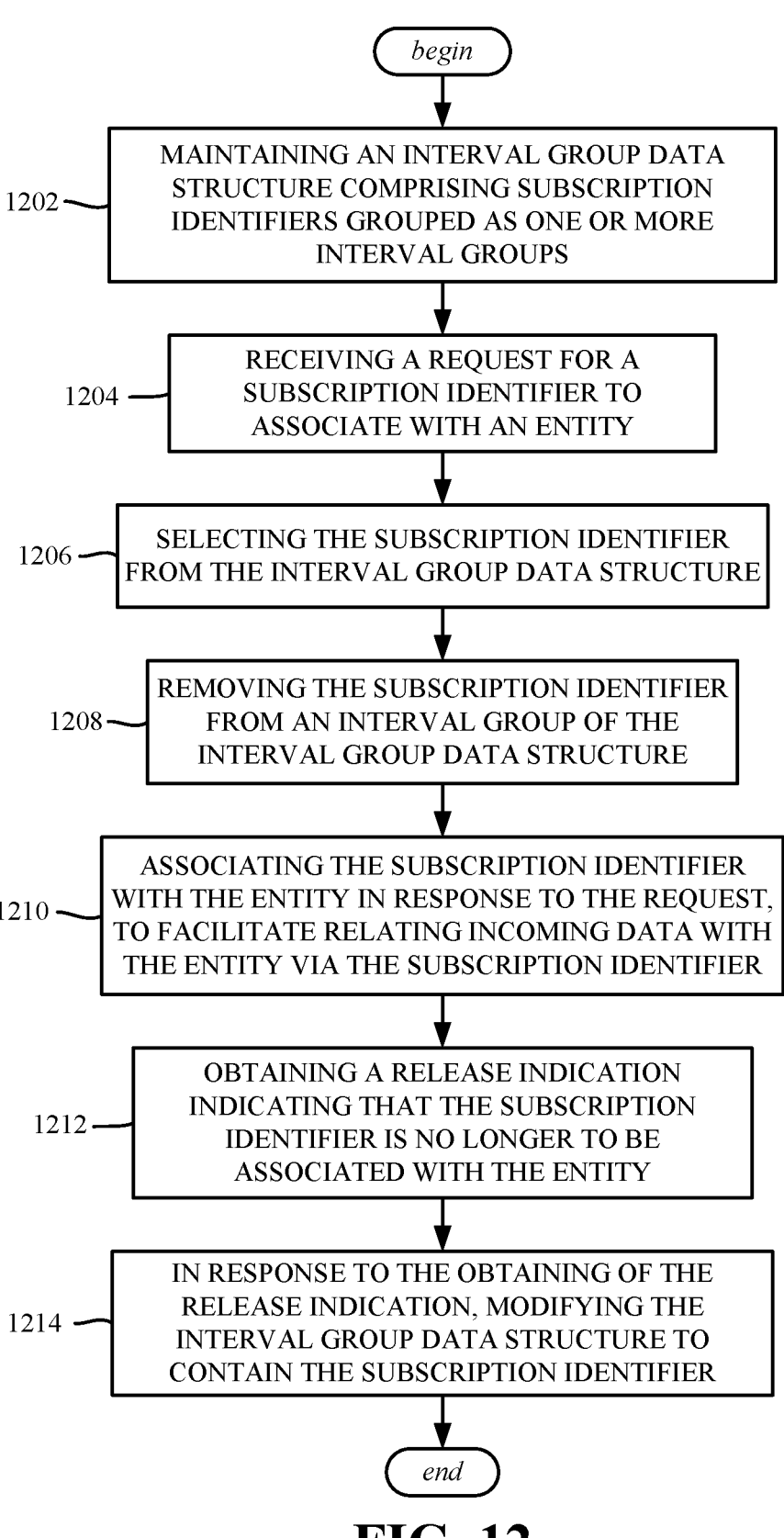

begin

1202 — MAINTAINING AN INTERVAL GROUP DATA STRUCTURE COMPRISING SUBSCRIPTION IDENTIFIERS GROUPED AS ONE OR MORE INTERVAL GROUPS

1204 — RECEIVING A REQUEST FOR A SUBSCRIPTION IDENTIFIER TO ASSOCIATE WITH AN ENTITY

1206 — SELECTING THE SUBSCRIPTION IDENTIFIER FROM THE INTERVAL GROUP DATA STRUCTURE

1208 — REMOVING THE SUBSCRIPTION IDENTIFIER FROM AN INTERVAL GROUP OF THE INTERVAL GROUP DATA STRUCTURE

1210 — ASSOCIATING THE SUBSCRIPTION IDENTIFIER WITH THE ENTITY IN RESPONSE TO THE REQUEST, TO FACILITATE RELATING INCOMING DATA WITH THE ENTITY VIA THE SUBSCRIPTION IDENTIFIER

1212 — OBTAINING A RELEASE INDICATION INDICATING THAT THE SUBSCRIPTION IDENTIFIER IS NO LONGER TO BE ASSOCIATED WITH THE ENTITY

1214 — IN RESPONSE TO THE OBTAINING OF THE RELEASE INDICATION, MODIFYING THE INTERVAL GROUP DATA STRUCTURE TO CONTAIN THE SUBSCRIPTION IDENTIFIER end

FIG. 12

GENERATING AND RELEASING OF RADIO ACCESS NETWORK INTELLIGENT CONTROLLER SUBSCRIPTION IDENTIFIERS

BACKGROUND

In a near-real-time radio access network (RAN) intelligent controller (typically referred to as a RIC in Open Radio Access Network, or O-RAN standards), extended Applications (xApps) can subscribe to a certain RAN E2 node's RAN-related data. Such data generally includes key performance indicators (KPIs), e.g., signal to interference plus noise ratio (SINR), reference signal received power (RSRP) and so on, whereby an xApp obtains periodic updates and issue actions to take. Each of these subscriptions has a unique identifier (ID) used to identify an exact subscription, that is, to associate an xApp with the incoming data.

In existing systems, a subscription manager within the RIC is responsible for assigning the subscription IDs in the range from 1 to $2^{16}$ for each subscription, and then reusing an ID after its corresponding subscription is done. Due to the time limit imposed on the RIC, ID generation and releasing is a time and space critical process and should be done in an efficient manner. However, existing approaches have the system allocate a list with size 65535 ($2^{16}$), and fill that list with values from 1 to 65535. When an ID is needed, the system removes the first element from the list and returns it for use; when released, if the list has enough capacity the released element gets appended to end of the list. If the list capacity is reached, then a new list is allocated with double the capacity and all elements copied from old list to the new one and then the released element is appended to the end of the list. This process is neither time efficient nor space efficient.

BRIEF DESCRIPTION OF THE DRAWINGS

The technology described herein is illustrated by way of example and not limited in the accompanying figures in which like reference numerals indicate similar elements and in which:

FIGS. 7A-7C show an example interval group data structure including two interval groups before releasing and reinserting a subscription ID, with the interval groups being merged thereafter to result in a single interval group, in accordance with various aspects and implementations of the subject disclosure.

FIG. 8 is a flow diagram showing example operations related to generating and returning a subscription identifier in response to a request, in accordance with various aspects and implementations of the subject disclosure.

FIG. 10 is a flow diagram showing example operations related to selecting and removing a subscription identifier from an interval group to subscribe an entity for association with incoming data, in accordance with various aspects and implementations of the subject disclosure.

FIG. 11 is a flow diagram showing example operations related to returning a subscription identifier from a selected interval group to facilitate association of an entity with the subscription identifier, and removing the subscription identifier, in accordance with various aspects and implementations of the subject disclosure.

FIG. 12 is a flow diagram showing example operations related to selecting, returning and removing a subscription identifier from a selected interval group for association with an entity, and modifying an interval group to contain the subscription identifier upon release, in accordance with various aspects and implementations of the subject disclosure.

DETAILED DESCRIPTION

Various aspects of the technology described herein are generally directed towards using one or more groups of intervals to efficiently allocate subscription identifiers (IDs). As will be understood, locating of identifiers to return for use (e.g., by an xApp) is accomplished by keeping track of the start and end values of available interval groups (each interval group referencing/containing one or more subscription identifiers), which allows the system to initiate and keep track of subscription identifiers in an efficient manner.

Whenever a previously assigned ID gets released, the value gets reinserted into an appropriate interval group, e.g., using binary search techniques to locate a relevant interval group. Reinsertion can result in a new interval group (with one value), or combining the released value with an existing interval group. A change to the interval group data structure due to reinsertion of a value can result in adjacent interval groups, which are merged into a single larger interval group.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
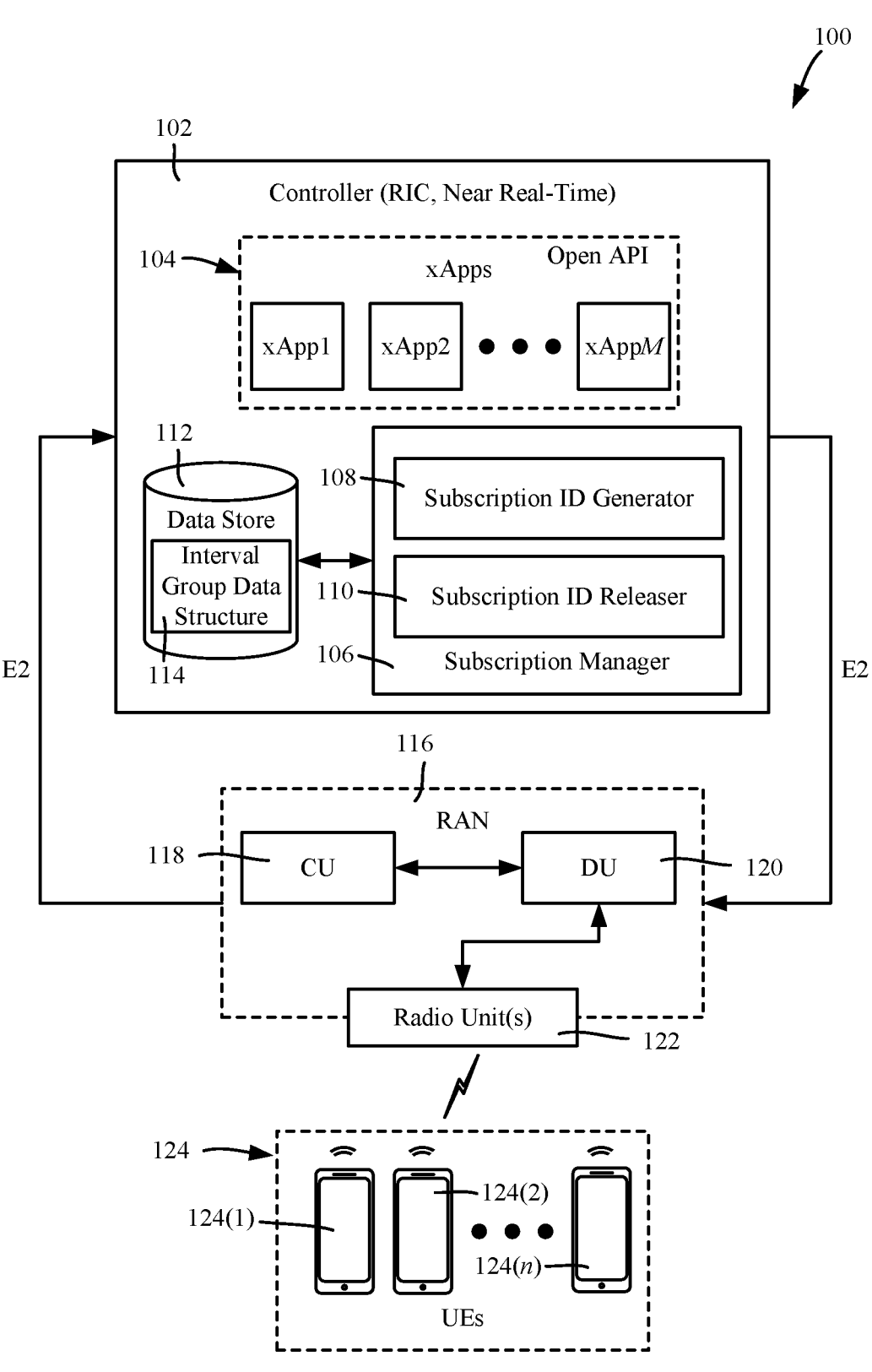
FIG. 1 depicts an example representation of a system/architecture including a radio access network (RAN) intelligent controller (near-real-time RIC) including a subscription manager that maintains and accesses an interval group data structure to return and reinsert subscription identifiers (IDs), in accordance with various aspects and implementations of the subject disclosure.

FIG. 1 is an example representation of a system/architecture 100 including a near-real-time Radio Access Network (RAN) Intelligent Controller (RIC) 102, e.g., in an Open Radio Access Network, or O-RAN environment. As can be seen, a number of extended applications, or xApps 104 (xApp1-xAppM) are deployed in the RIC 102. In general, an xApp is an application deployed in the RIC 102 that handles optimizations or the like for specific use cases; to do so, xApps subscribe on RAN-specific data include key performance indicators (KPIs) through the E2 interface.

As described herein, a subscription manager 106 handles entity-to-subscription identifier (ID) associations, e.g., xApp-to-E2 node subscriptions. Via a subscription ID generator 108, the subscription manager 106 returns a unique (within the RIC environment) subscription ID upon request, for use by an xApp until released when no longer needed. Thus, as described herein, in one implementation the subscription ID generator 108 is responsible for generating subscription IDs for subscriptions, to be used in xApp-to-E2 node communications.

The subscription manager 106 also includes a subscription ID releaser 110, which handles reinsertion of a released subscription ID to make that subscription ID eligible for reuse by the system, e.g., by another xApp instance. As described herein, the subscription ID releaser 110 is responsible for releasing a subscription ID after termination of the corresponding xApp-to-E2 node subscription, to facilitate reuse in future subscriptions. In general, the subscription manager 106, subscription ID generator 108 and subscription ID releaser 110 are modules within the RIC 102 that are responsible for handling subscriptions between xApps and radio access networks.

As shown in FIG. 1, a data store 112 (e.g., in RIC memory) maintains an interval group data structure 114 from which the subscription IDs are generated and returned, and into which the subscription IDs are reinserted upon release. The data store 112 also holds the subscription (e.g., association) data for the xApps. Further, as described herein, the generation of a subscription ID needs to be efficient, and thus the data store 112 can include sufficiently fast memory (e.g., RAM) for maintaining the interval group data structure 114.

Also shown in FIG. 1 are RAN components (block 116) coupled to the RIC 102 via an E2 interface; the RAN is alternatively referred to herein as the E2 node. The RAN components 116 include at least one centralized unit (CU) 118, at least one distributed unit (DU) 120 and one or more radio units 122. For completeness, the radio units 122 are shown as communicating with user equipment UEs 124 (e.g., devices 124(1)-124 (n)).

Figure 2A:
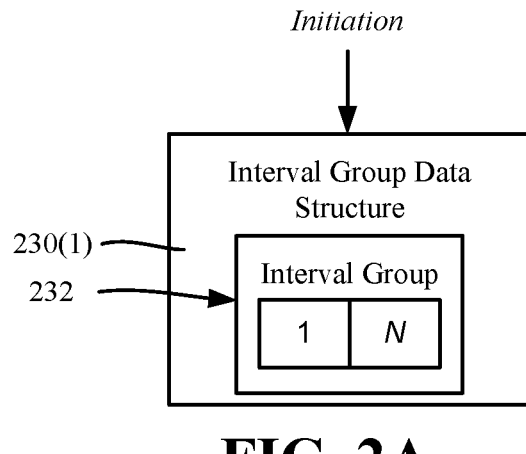
FIGS. 2A-2C show an example interval group data structure for generating and returning a subscription ID from a single interval group, which is updated thereafter, in accordance with various aspects and implementations of the subject disclosure.

Turning to the interval group data structure 114 and generation of subscription IDs, FIG. 2A shows an initial state 230(1) of the interval group data structure. More particularly, upon system initiation of the RIC 102, the subscription manager 106 initializes the ID interval group data structure 114 for later use in ID generation and releasing operations as described herein. To this end, the subscription manager 106 initializes the interval list by allocating a pair of elements and adding them to the interval group data structure 114, with the first element as the starting value, or index, and the second value, or index being the maximum number N to be generated in the list. Once allocated, the interval group data structure 114 contains the subscription ID values 1-N, by way of their lowest and highest boundaries, even though only the values of 1 and N occupy actual memory (the individual values between 2 and N–1, inclusive, do not currently occupy actual memory) which is highly space efficient. Note that the time complexity to initiate the interval list is O(1), and the space complexity to initiate the interval list is O(1).

Thus, in the initial state 230(1) of FIG. 2A, a single interval group 232(1) is present, containing available subscription identifiers ranging from 1 to N, wherein N can be any practical number of subscription IDs; N can also be increased (or decreased) as appropriate. Note that increasing N is extremely efficient compared to existing systems in which, when the $2^{16}$ list capacity is reached, a new list is allocated with double the capacity, and all elements are copied from the old list to the new one. Indeed, in the present system, N can be increased as needed, including in advance of actual need, e.g., when the number of available subscription IDs falls below a threshold amount.

Figure 2B:
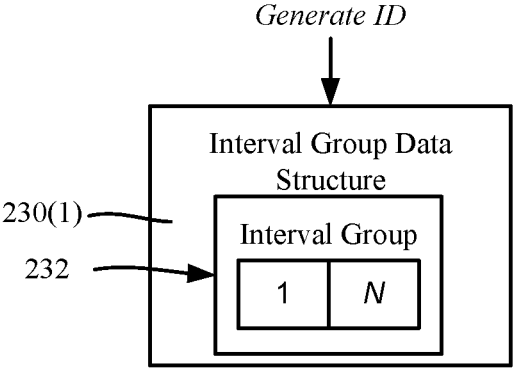
Figure 2C:
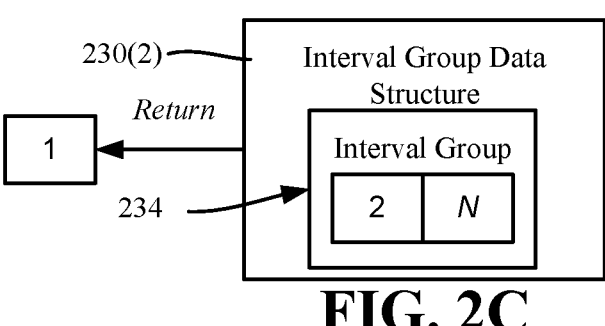

FIG. 2B shows a request to generate an ID being received by the subscription manager 106, which calls the subscription ID generator 108 to generate the ID. In one implementation, the lowest value of the lowest interval group (in this state there is only the one interval group 232(1)) is located by the subscription ID generator 108 and returned, as shown in FIG. 2C. Once returned, the subscription ID generator 108 removes this value from the set of available values, in this example by incrementing the lowest (now in use) value of 1 such that the lowest available value is now 2, as shown in the updated interval group 234 of the updated interval group data structure state 230(2) in FIG. 2C. Note that while returning the lowest value of the lowest interval group is highly efficient, it is feasible to return any available value from any interval group, although likely less efficient.

It should be noted that a subscription ID can be any of the values ranging from 1-N, that is, simply the numeric value. In various alternatives, the values can be pointers/indexes into other values, including alphanumeric strings or the like, e.g., ID=4→ABCXYZ0f. Similarly, an ID can be part of some larger identifier, e.g., ABCDEF, such as with the returned value from the subscription ID generator 108 prepended or appended thereto, e.g., ABCDEF1, ABCDEF2, and so on.

Figure 3A:
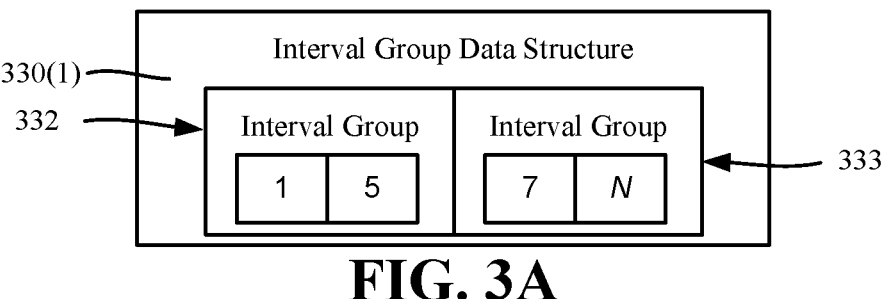
FIGS. 3A-3C show an example interval group data structure including two interval groups for generating and returning a subscription ID, with one interval group being updated thereafter, in accordance with various aspects and implementations of the subject disclosure.

Turning to another example, eventually the initial single interval group will likely be split into more than one interval group. Consider, for example, that subscription IDs 1-6 have been generated and are in use. Over time, subscription IDs 1-5 have been released and again eligible for reuse (after reinsertion into the interval group data structure as described herein); however, subscription ID 6 is still in use. This split state is depicted in FIG. 3A, in which two interval group states 332 and 333 are present in the interval group data structure state 330(1), ranging from 1-5 and 7-N, respectively.

Figure 3B:
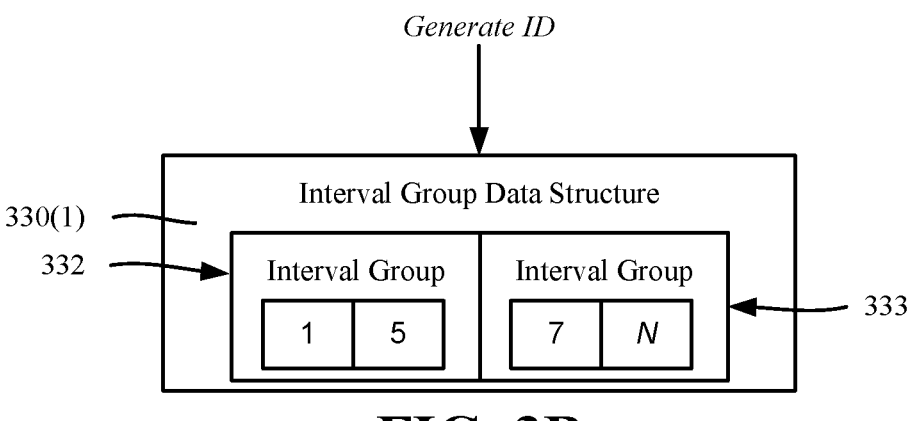
Figure 3C:
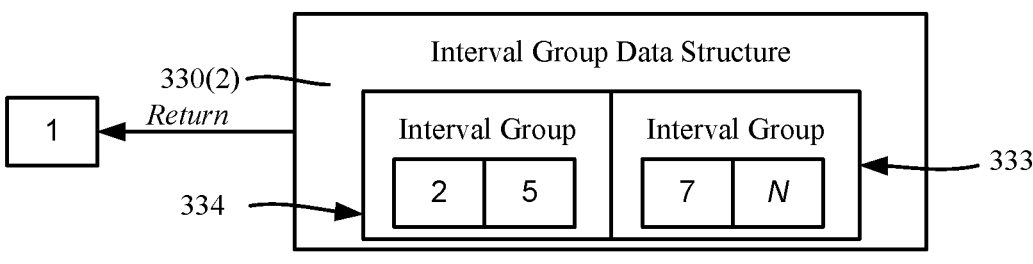

When a request to generate an ID is received by the subscription manager 106, the subscription ID generator 108 is called to generate the ID. Again, in this example implementation, the lowest interval group 332 is located by the subscription ID generator 108 and the lowest value therein, namely 1, is returned, as shown in FIGS. 3B and 3C. Once returned, the subscription ID generator 108 removes this value from the set of available values, in this example by incrementing the lowest value of 1 such that the lowest available value is now 2 as shown in the updated interval group 334 of the updated interval group data structure in state 330(2) of FIG. 3C; the interval group 333 remains unchanged.

Figure 4A:
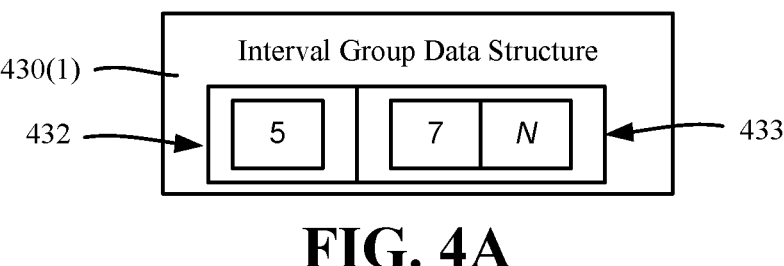
FIGS. 4A-4C show an example interval group data structure including two interval groups for generating and returning a subscription ID, with one interval group being removed which results in a single remaining interval group, in accordance with various aspects and implementations of the subject disclosure.
Figure 4B:
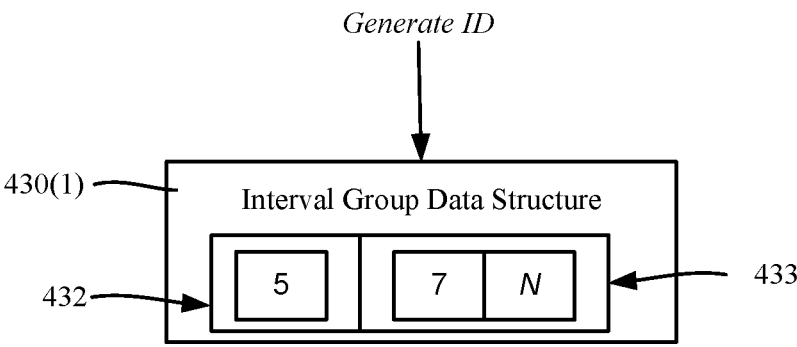
Figure 4C:
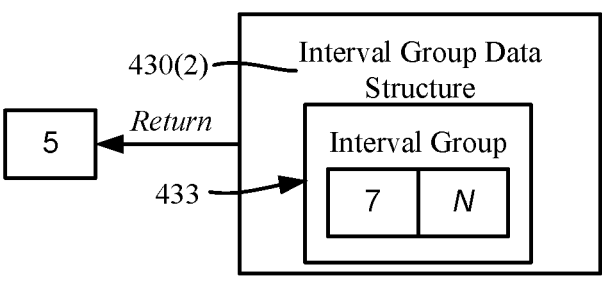

FIGS. 4A-4C depict another example, in which incrementing of the lowest subscription ID value cannot be performed because the next value is not available for use. In this example, subscription IDs 1-6 have been generated and are in use, however at some point subscription ID 5 has been released and is available for reuse after reinsertion into the interval group data structure 230. There are thus two interval groups 432 and 433 present in the interval group data structure in state 430(1) of FIG. 4B, containing 5 and the range 7-N, respectively.

When a request to generate an ID is received by the subscription manager 106, the subscription ID generator 108 is called to generate the ID. Again, in this example implementation, the lowest interval group 432 is located by the subscription ID generator 108 and the lowest value therein, namely 5, is returned, as shown in FIGS. 4B and 4C. Once returned, the subscription ID generator 108 removes this value from the set of available values, in this example by removing the (now-empty) interval group 432; note that incrementing to 6 would be an error, as subscription ID 6 is still in use. Thus, as seen in FIG. 4C, the lowest available value of the lowest interval group state 433 (the only remaining interval group) is now 7 for the next subscription ID generation (unless a lower value gets released before a next subscription ID generation is requested).

Thus, using a set of interval groups to efficiently allocate subscription IDs can be done by keeping track of the start and end of available interval groups, which allows the system to initiate and keep track of IDs in an efficient manner. The interval group data structure starts with a single element containing an interval of the first ID to the maximum ID available to the system. Whenever a new ID needs to be generated, the first element in the first interval is used and the value in the interval group data structure is updated to indicate the new available IDs. Using a sorted list of interval groups, the memory usage of the subscription ID generation is at most O(k) where k<=N/2, and N is the maximum number of IDs available. The solution has a time complexity in releasing an ID with a worst case of O(k) where k<=N/2, and N is the maximum number of IDs available, and average case of constant time.

Turning to the releasing of subscription IDs, whenever an ID gets released, the value gets reinserted into the space and time efficient interval group data structure using a binary search, (although a linear search is also feasible).

Figure 5A:
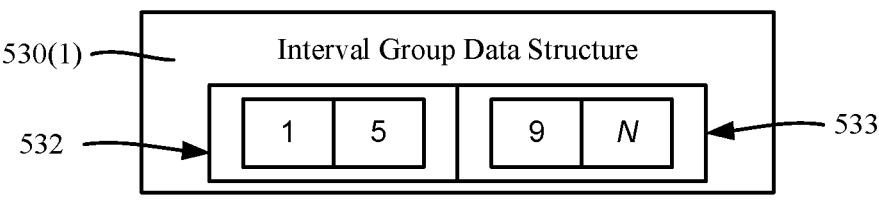
FIGS. 5A-5C show an example interval group data structure including two interval groups before releasing and reinserting a subscription ID, and being updated thereafter which results in a third interval group, in accordance with various aspects and implementations of the subject disclosure.
Figure 5B:
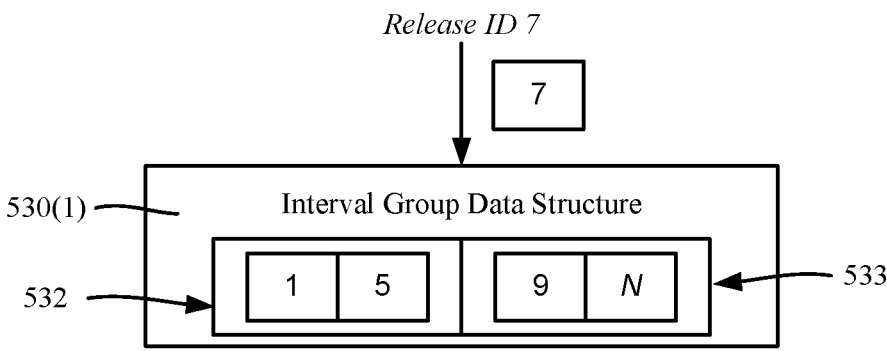

FIG. 5A shows an example in which the interval group data structure is in a state 530(1) that includes two interval groups 532 and 533, with subscription ID values ranging from 1-5 and 9-N, respectively. In this example, subscription ID 7 is released, and is thus to be reinserted into the interval group data structure, as shown in FIG. 5B. Via a search, e.g., a binary search, and upon evaluation, the subscription ID releaser 110 (FIG. 1) determines that there is no existing interval group with a value adjacent the just-released value of 7; as such, a new interval group 534 with the value of 7 is created between the interval groups 532 and 533, resulting in the updated interval group data structure shown in state 530(2).

Figure 5C:
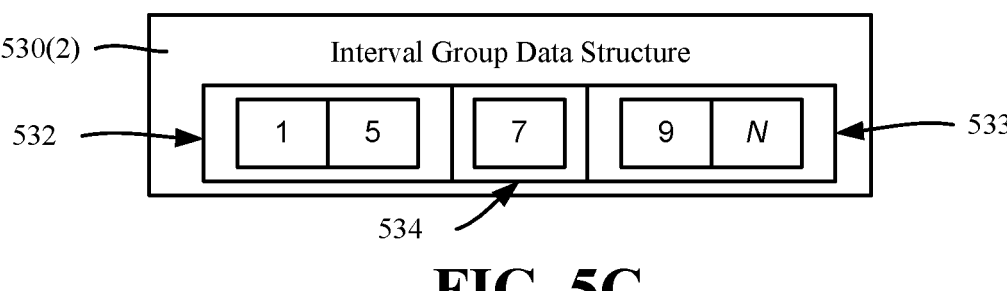
Figure 6A:
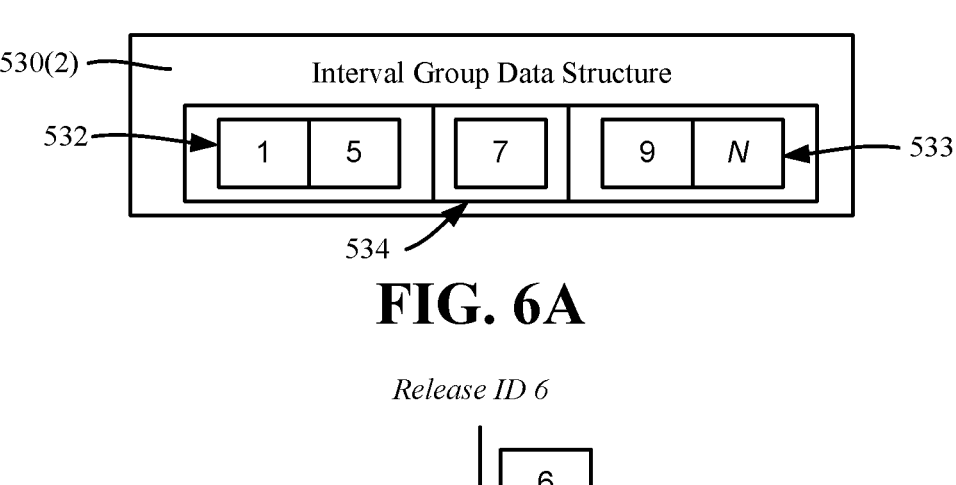
FIGS. 6A-6D show an example interval group data structure including three interval groups before releasing and reinserting a subscription ID, and being updated thereafter which results in combining two of the interval groups, in accordance with various aspects and implementations of the subject disclosure.
Figure 6B:
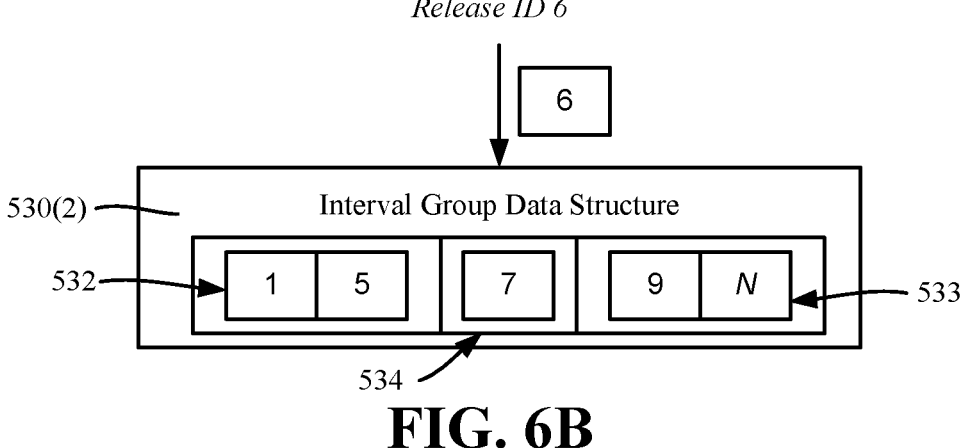
Figure 6C:
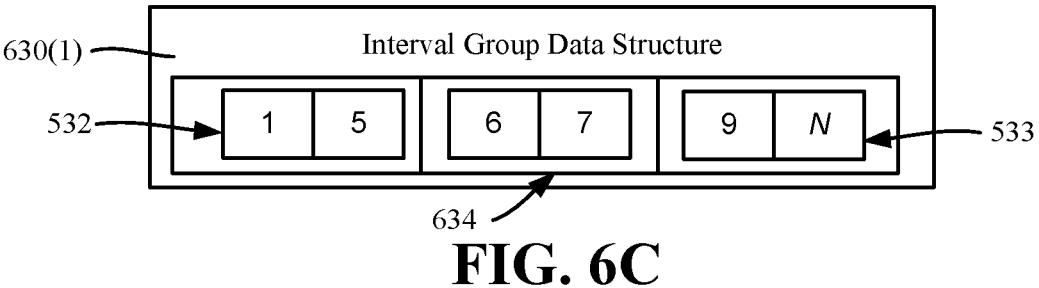
Figure 6D:
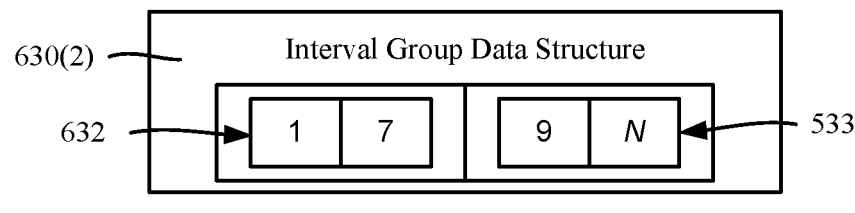

Sometimes one interval group is located with a value (or two interval groups with values) adjacent to a released value to reinsert. An example is shown in FIG. 6A, in which the interval group data structure in state 530(2) of FIG. 5C has been replicated as FIG. 6A for case of understanding the example. In this example, subscription ID 6 is released, and thus is to be reinserted into the interval group data structure, as shown in FIG. 6B. Via a search and upon evaluation, the subscription ID releaser 110 (FIG. 1) determines that there is an existing interval group with a value adjacent the value of 6, namely the interval group 534 which contains the adjacent value 7. Thus, the adjacent interval group is updated to include 6, as shown in the updated interval group 634 of the updated interval group data structure in state 630(1) of FIG. 6C. Upon further evaluation, the subscription ID releaser 110 recognizes that the updated interval group 634 is adjacent the interval group 532, that is, the lowest value of 6 the updated interval group 634 is adjacent the highest value of 5 of the existing interval group 532. Thus, these two interval groups are merged by the subscription ID releaser 110 into a single interval group 632, as shown in the updated (after merging) interval group data structure in state 630(2) of FIG. 6D.

As can be readily understood, the same result is obtained if, as shown in FIG. 6B, the interval group 532 having values 1-5 was located and identified (instead of the interval group 534), as this interval group 532 has its highest value of 5 adjacent the value of 6 to insert. Although not explicitly depicted, it is understood that the value of 5 can be incremented to 6, with the resulting interval group from 1-6 then merged with the interval group containing 7, providing the same post-merged interval group data structure shown in state 630(2) of FIG. 6D.

Figures 7A, 7B, 7C:
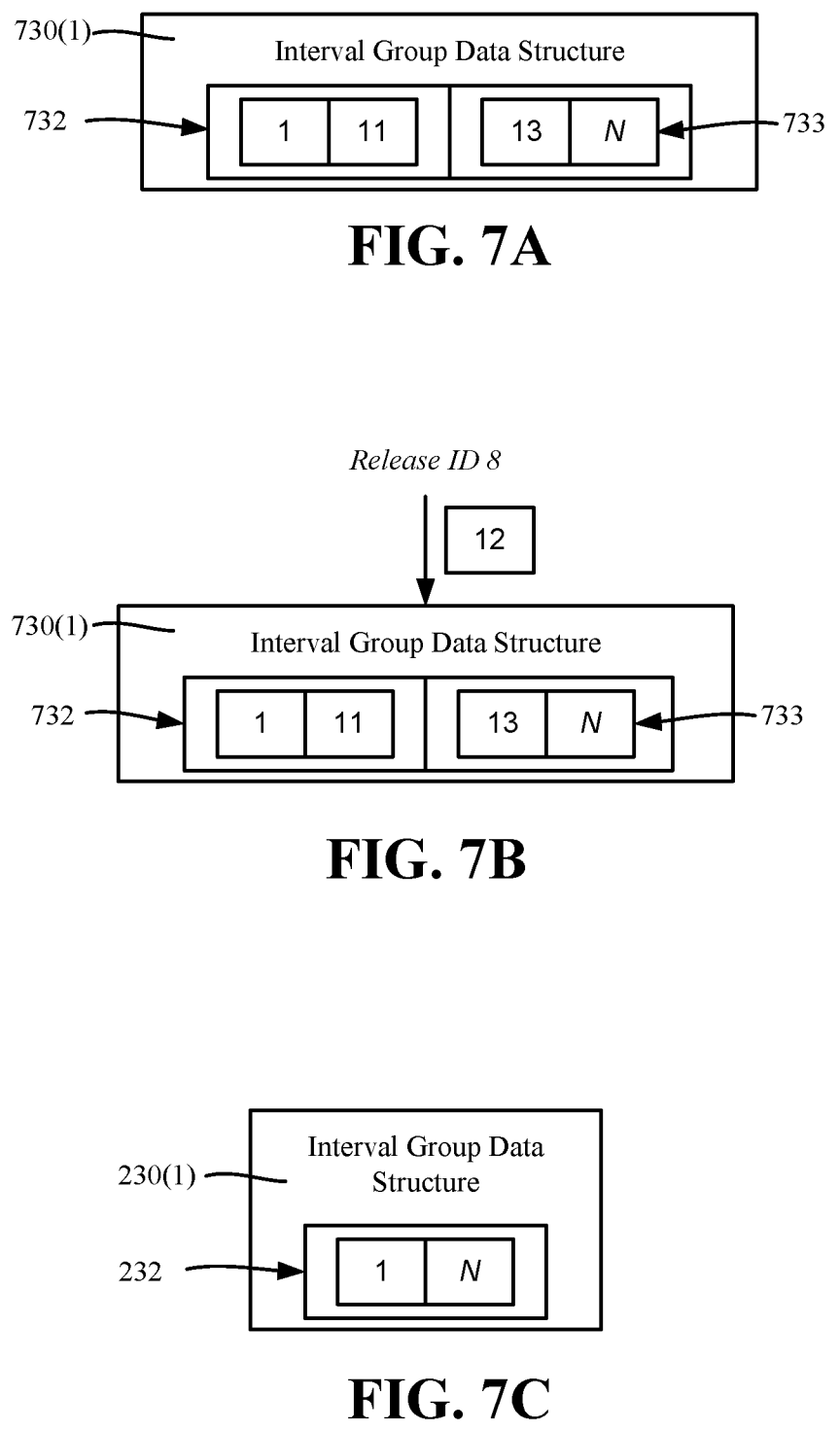

Merging is further described with reference to FIGS. 7A-7C. In FIGS. 7A and 7B, two interval groups 732 and 733 are present in the interval group data structure state 730(1), ranging from 1-11 and 13-N, respectively. In FIG. 7B, subscription ID 12 is released, and thus either the highest value of the interval group 732, namely 11, is incremented to 12, or the lowest value of the lowest value of the interval group 733, namely 13, is decremented to 12; (as described with reference to FIGS. 6A-6B, either interval group can be located depending on a particular implementation). Whether the lower group's highest value is incremented or the higher group's lowest value is decremented to 12, the subscription ID releaser 110 recognizes that the two interval groups are adjacent groups. Thus, these two interval groups are merged by the subscription ID releaser 110; this results in the initial, single interval group 232 (the same as in FIG. 2A), as shown in the updated (after merging) interval group data structure in state 230(1) of FIG. 7C (corresponding to the initial state 230(1) of FIG. 2A).

FIG. 8 is a flow diagram showing example operations related to generating a subscription ID, beginning at operation 802 where an xApp sends a subscription request to the subscription manager 106 (FIG. 1). More particularly, when a new xApp instance wants to subscribe on specific data from the E2 node, the xApp instance sends a subscription request to the RIC, which corresponds to the subscription manager 106 obtaining the request at operation 804. At operation 806, the subscription manager 106 calls or otherwise triggers the subscription ID generator 108 to handle the generation of a subscription ID for use in upcoming communications between the xApp and E2 node.

The subscription ID generator checks the interval group data structure for an available ID. In this example implementation, the subscription ID generator 108 locates the lowest interval group and selects the lowest value (e.g., which can be considered the interval group's starting index) at operation 808; that is, the subscription ID generator 108 selects the starting number of the minimum interval group (window).

Then, if the selected ID was the only ID in the interval group, operation 812 removes the interval group, as described above with reference to FIGS. 4A-4C. If instead there was at least one other ID contained in the interval group, operation 814 is performed to determine whether the interval group contained at least three IDs, that is, there at least three IDs contained within the ranged identified by the starting and ending values. If not at least three IDs (e.g., the interval group only contained 31 and 32), then there are two values, and the lowest, just-selected value (of 31) is removed at operation 816 to make that value unavailable for use (until released), leaving only the one, higher value (of 32, the lowest value plus one) remaining as available in the interval group; (note that incrementing 31 would result in 32 being available twice, which would be an error unless merged right away instead of simply removing 31 from the interval group). If there were at least three values, operation 818 increments the just-selected (lowest) value, that is, the start of the minimum interval group from the interval group to change the range's lowest value, as described above with reference to FIGS. 2A-2C and 3A-3C.

Once generated by the subscription ID generator 108 and returned in response to the call, the subscription manager 110 assigns the generated number to the subscription for use as the subscription ID for future xApp and E2node communication, and returns the selected subscription ID in response to the request from the xApp at operation 820. The xApp is now associated with the selected subscription ID, which is no longer available for use (until released), and the subscription manager (or RIC) can use the selected subscription ID with respect to communications between the xApp and the E2 node, as represented by operation 822.

Note that the time complexity of ID generation is O(1); to summarize, the flow is started by the xApp sending a subscription request to subscribe to an existing E2 node. The subscription manager processes the request and calls the subscription ID generator component to generate a subscription ID to be associated with the request. The subscription ID generator picks the lowest interval group's starting index to be the ID and modifies the interval group, e.g., removes one value (which may have been the entire interval group), or increments the lowest interval's starting index if appropriate. The returned ID is used by the subscription manager for attaching it to the subscription request, to be used for future communication between the E2 node and the xApp.

It is also possible to proactively select and remove a subscription identifier from the interval group data structure in advance of an actual request for it, such as in a background operation when no generation requests are incoming.

For example, the lowest subscription identifier(s) can be found and buffered before requested, and rapidly returned from the buffer when eventually requested. In other words, via the buffer, the subscription identifier is returned from the interval group data structure indirectly rather than directly. This may be faster than reacting to a request by finding the lowest interval group and then the lowest value in that interval group's range, as doing so and buffering would have already been done proactively. It is possible that a lower value may be released before the buffered value is returned in response to a generation request, however the lower value can be put into the buffer, or reinserted into the interval group data structure as otherwise described herein, because the actual value returned from the buffer need not be the lowest possible ID, only a unique value.

Figure 9:
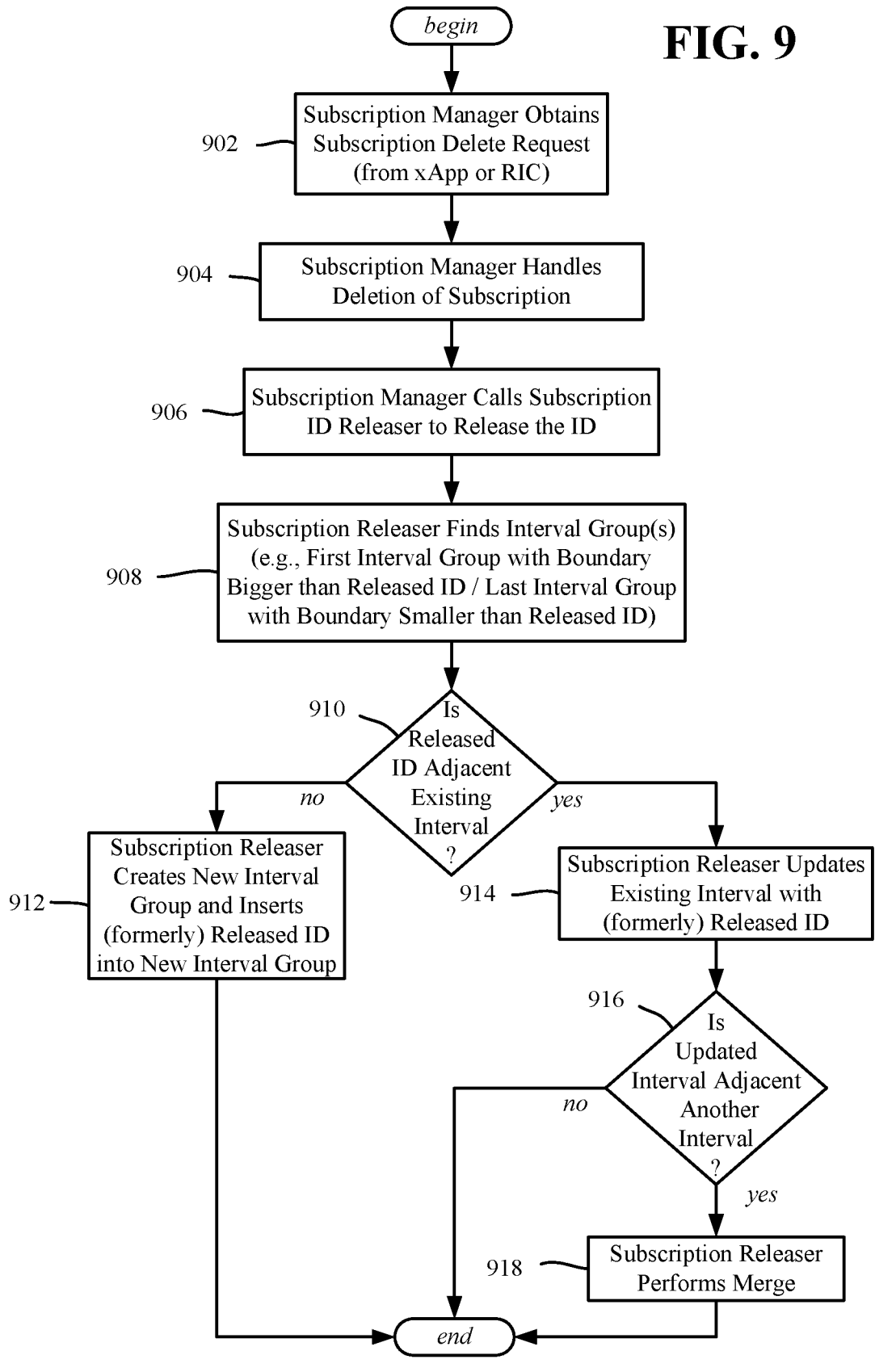
FIG. 9 is a flow diagram showing example operations related to reinserting a released subscription identifier into an interval group data structure, in accordance with various aspects and implementations of the subject disclosure.

FIG. 9 is a flow diagram showing example operations related to releasing a subscription ID, beginning at operation 902 where the subscription Manager 110 (FIG. 1) obtains a subscription delete request from an xApp or the RIC. Operation 904 represents the subscription manager 106 handing deletion of the subscription, including calling the subscription ID releaser 110 to release the subscription ID at operation 906, e.g., reinsert the subscription ID into the interval group data structure for subsequent use.

As described above, the subscription ID releaser 110 locates (searches to find) an interval group for reinserting the now-released subscription ID, if one (or two) have an adjacent value. As also described above, this can be the first (highest) interval group having a boundary value greater than the released ID, and/or the last (lowest) interval group having a boundary less than the released ID.

Operation 910 evaluates whether the released ID is adjacent to an existing interval group, that is, an interval group found via operation 908. If not, via operation 912 the subscription releaser creates a new interval group and inserts the (now formerly) released ID into the new interval group. The inserted subscription ID is now available for use.

If instead the released ID is adjacent to an existing interval group found at operation 908, the subscription releaser, via operation 914, updates the existing interval with the (now-formerly) released subscription ID. As described above, this can be by incrementing a lower interval group's adjacent value to now include the subscription ID in the interval group, or by decrementing a higher interval group's adjacent value to now include the subscription ID in the interval group.

As also described above, it is possible that operation 914 results in the updated interval group now being adjacent to a neighboring interval group in the interval group data structure. If so, as determined by operation 916, operation 918 merges these adjacent interval groups.

Thus, once a subscription is no longer needed by the RIC or the xApp, the subscription gets deleted from the RIC. Note that some of the operations related to deletion need not be performed right away. For example, unless the number of remaining available IDs is low, reinsertion can take place on a somewhat lazy basis and/or in a background operation, and indeed, numbers to reinsert can be first buffered if needed, (with numbers pulled from the buffer if lower or if nothing else is available). Merging, if needed, can also be done at a later time and/or in a background operation. Indeed, it is feasible to create and insert a new interval group for any released ID (as in operation 912), even a released ID adjacent an existing interval group, and merge later, although this would be temporarily inefficient with respect to memory usage.

To summarize an example implementation, after the subscription is deleted by subscription manager, the subscription ID releaser handles the release of the ID so that it can be reused by new subscriptions. The released ID gets reinserted into the interval group data structure, such as by binary searching for the first interval where either the start of interval group or the end is larger than the ID. If the start of the interval group is larger than the ID to be released, then the ID gets added as a new interval to the list. If the end of the interval group is larger than the ID to be released, then the interval gets updated and other nearby intervals are merged if needed, that is, one or more other adjacent intervals are merged accordingly as needed.

One or more aspects can be embodied in a network device, such as represented in the example operations of FIG. 10, and for example can include a memory that stores computer executable components and/or operations, and a processor that executes computer executable components and/or operations stored in the memory. Example operations can include operation 1002, which represents maintaining an interval group data structure comprising subscription identifiers grouped as subscription identifier interval data. Example operation 1004 represents receiving a request for a subscription identifier to associate with an entity. Example operation 1006 represents selecting the subscription identifier from the interval group data structure. Example operation 1008 represents removing the subscription identifier from an interval group of the subscription identifier interval data. Example operation 1010 represents in response to the request to subscribe the entity via the subscription identifier, associating the subscription identifier with the entity to facilitate association of incoming data with the entity.

The incoming data can include radio access network data, and the entity can include an extended application (xApp) deployed in a radio access network intelligent controller.

Removing the subscription identifier from the interval group can include determining whether the subscription identifier was the only subscription identifier of the interval group from which the subscription identifier was selected, and, in response to determining that the subscription identifier was the only subscription identifier of the lowest interval group, removing the interval group from the interval group data structure.

Selecting the subscription identifier from the interval group data structure can include selecting a lowest-valued subscription identifier of a lowest interval group of the interval group data structure. Removing of the subscription identifier from the lowest interval group of the interval group data structure can include determining that the lowest valued subscription identifier of the lowest interval group of the interval group data structure was not the only subscription identifier of the lowest interval group, and, in response to the determining, incrementing the lowest valued subscription identifier of the lowest interval group of the interval group data structure.

Further operations can include obtaining an indication that the subscription identifier is released from the association, and, in response to the obtaining of the indication, modifying the interval group data structure to contain the subscription identifier.

Modifying the interval group data structure to contain the subscription identifier can include creating, in the interval group data structure, a new interval group that contains the subscription identifier.

Further operations can include determining that the new interval group is adjacent to an existing interval group, and, in response to the determining, merging the new interval group with the existing interval group into a merged interval group of the interval group data structure.

Modifying the interval group data structure to contain the subscription identifier can include locating an existing interval group in the interval group data structure that has an adjacent value to a value of the subscription identifier, and changing the adjacent value to the value of the subscription identifier to produce a changed existing interval group in the interval group data structure.

Further operations can include determining that changed existing interval group is adjacent to another existing interval group, and, in response to the determining, merging the changed existing interval group with the other existing interval group into a merged interval group of the interval group data structure.

One or more example aspects, such as corresponding to example operations of a method, are represented in FIG. 11. Example operation 1102 represents maintaining, by a system comprising a processor, an interval group data structure comprising subscription identifiers within one or more interval groups of subscription identifiers. Example operation 1104 represents receiving, by the system, a request for a subscription identifier. Example operation 1106 represents returning, by the system in response to the request, a subscription identifier from a selected interval group to facilitate association of an entity with the subscription identifier. Example operation 1108 represents modifying, by the system, the selected interval group to no longer contain the subscription identifier.

Modifying the selected interval group to no longer contain the subscription identifier can include changing a first value of the subscription identifier of the selected interval group to a second value that is different from the first value.

The subscription identifier from the selected interval group can be the only subscription identifier of the selected interval group, and modifying the selected interval group to no longer contain the subscription identifier can include removing the selected interval group from the interval group data structure.

Further operations can include obtaining, by the system, an indication that the subscription identifier is to be released, and in response to the obtaining of the indication, releasing the subscription identifier, comprising modifying the interval group data structure to contain the subscription identifier.

Modifying the interval group data structure to contain the subscription identifier can include determining whether the subscription identifier is adjacent an existing interval group, in response to determining that the subscription identifier is adjacent to an existing interval group, modifying the existing interval group to contain the subscription identifier, and in response to determining that the subscription identifier is not adjacent to an existing interval group, creating a new interval group in the interval group data structure that contains the subscription identifier.

The interval group that contains the subscription identifier can be a first interval group, and further operations can include determining, by the system, that the first interval group is adjacent a second interval group, and in response to the determining, merging the first interval group with the second interval group into a merged interval group of the interval group data structure.

FIG. 12 summarizes various example operations, e.g., corresponding to a machine-readable medium, comprising executable instructions that, when executed by a processor, facilitate performance of operations. Example operation

1202 represents maintaining an interval group data structure comprising subscription identifiers grouped as one or more interval groups.

Example operation 1204 represents receiving a request for a subscription identifier to associate with an entity. Example operation 1206 represents selecting the subscription identifier from the interval group data structure. Example operation 1208 represents removing the subscription identifier from an interval group of the interval group data structure. Example operation 1210 represents associating the subscription identifier with the entity in response to the request, to facilitate relating incoming data with the entity via the subscription identifier. Example operation 1212 represents obtaining a release indication indicating that the subscription identifier is no longer to be associated with the entity. Example operation 1214 represents, in response to the obtaining of the release indication, modifying the interval group data structure to contain the subscription identifier.

Removing the subscription identifier from the interval group can include determining whether the subscription identifier was the only subscription identifier of the interval group, in response to determining that the subscription identifier was the only subscription identifier of the interval group, removing the interval group from the interval group data structure, and in response to determining that the subscription identifier was not the only subscription identifier of the interval group, modifying the interval group to no longer contain the subscription identifier.

Modifying the interval group data structure to contain the subscription identifier can include determining whether the subscription identifier is adjacent an existing interval group, in response to determining that the subscription identifier is adjacent an existing interval group, modifying the existing interval group to contain the subscription identifier, and in response to determining that the subscription identifier is not adjacent to an existing interval group, creating a new interval group in the interval group data structure that contains the subscription identifier.

Modifying the interval group data structure to contain the subscription identifier can include modifying an existing interval group into a first interval group that contains the subscription identifier, the operations further can include determining that the first interval group is adjacent a second interval group, and in response to the determining that the first interval group is adjacent to the second interval group, merging the first interval group with the second interval group into a merged interval group of the interval group data structure.

As can be seen, the technology described herein facilitates efficient generation and releasing of near-real-time RIC subscription IDs. The technology is based on using a space-efficient and time-efficient interval group data structure in which interval groups are accessed for generating and releasing subscription IDs.

Figure 13:
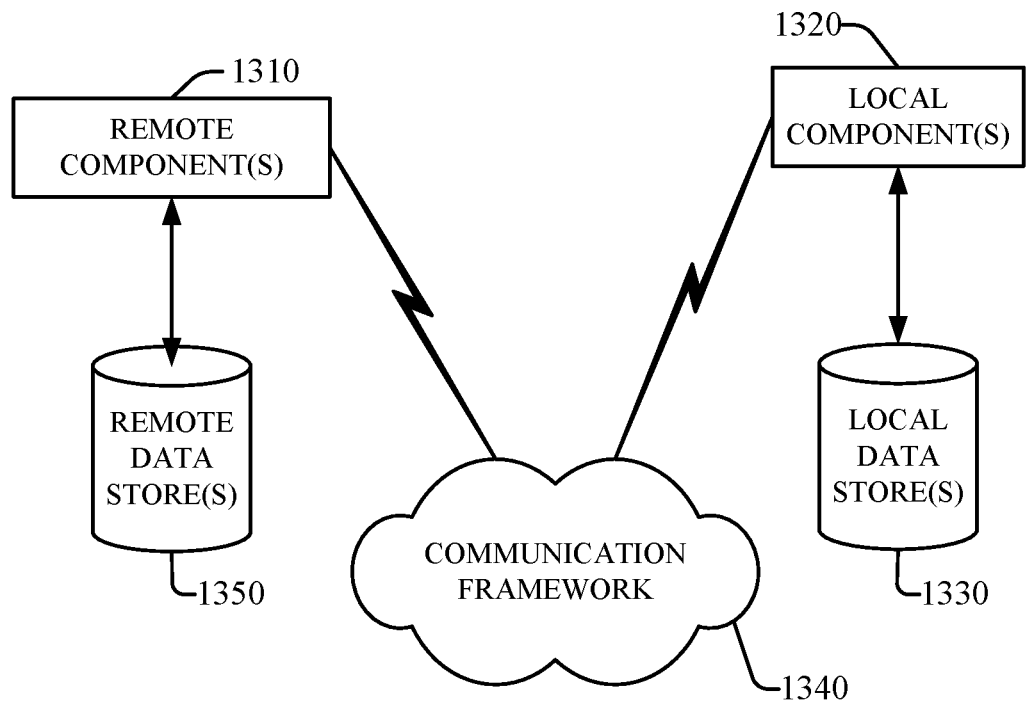
FIG. 13 is a block diagram representing an example computing environment into which aspects of the subject matter described herein may be incorporated.

FIG. 13 is a schematic block diagram of a computing environment 1300 with which the disclosed subject matter can interact. The system 1300 comprises one or more remote component(s) 1310. The remote component(s) 1310 can be hardware and/or software (e.g., threads, processes, computing devices). In some embodiments, remote component(s) 1310 can be a distributed computer system, connected to a local automatic scaling component and/or programs that use the resources of a distributed computer system, via communication framework 1340. Communication framework 1340 can comprise wired network devices, wireless network devices, mobile devices, wearable devices, radio access network devices, gateway devices, femtocell devices, servers, etc.

The system 1300 also comprises one or more local component(s) 1320. The local component(s) 1320 can be hardware and/or software (e.g., threads, processes, computing devices). In some embodiments, local component(s) 1320 can comprise an automatic scaling component and/or programs that communicate/use the remote resources 1310, etc., connected to a remotely located distributed computing system via communication framework 1340.

One possible communication between a remote component(s) 1310 and a local component(s) 1320 can be in the form of a data packet adapted to be transmitted between two or more computer processes. Another possible communication between a remote component(s) 1310 and a local component(s) 1320 can be in the form of circuit-switched data adapted to be transmitted between two or more computer processes in radio time slots. The system 1300 comprises a communication framework 1340 that can be employed to facilitate communications between the remote component(s) 1310 and the local component(s) 1320, and can comprise an air interface, e.g., Uu interface of a UMTS network, via a long-term evolution (LTE) network, etc. Remote component(s) 1310 can be operably connected to one or more remote data store(s) 1350, such as a hard drive, solid state drive, SIM card, device memory, etc., that can be employed to store information on the remote component(s) 1310 side of communication framework 1340. Similarly, local component(s) 1320 can be operably connected to one or more local data store(s) 1330, that can be employed to store information on the local component(s) 1320 side of communication framework 1340.

Figure 14:
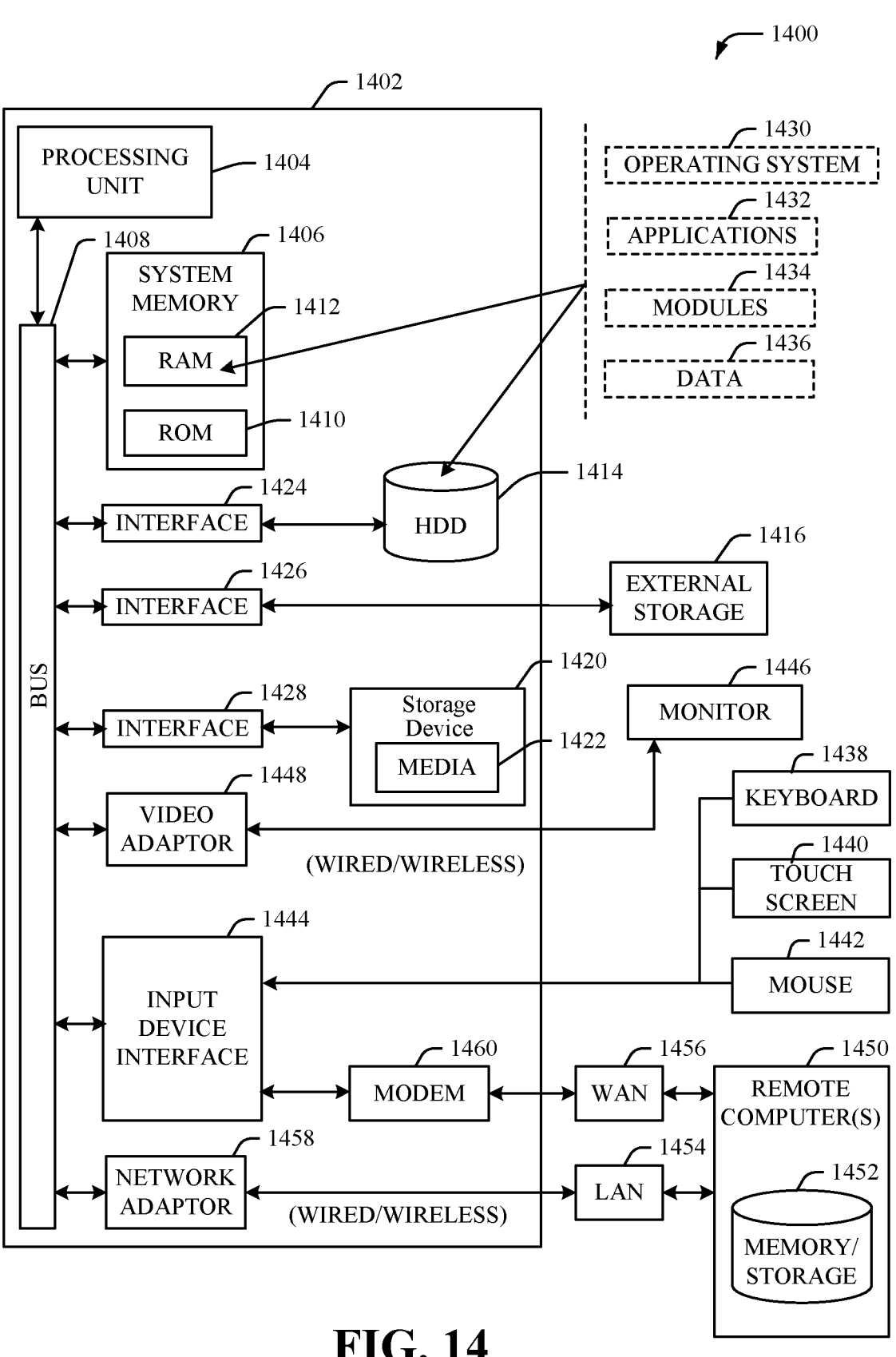
FIG. 14 depicts an example schematic block diagram of a computing environment with which the disclosed subject matter can interact/be implemented at least in part, in accordance with various aspects and implementations of the subject disclosure.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), and can include one or more external storage devices 1416 (e.g., a magnetic floppy disk drive (FDD) 1416, a memory stick or flash drive reader, a memory card reader, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414.

Other internal or external storage can include at least one other storage device 1420 with storage media 1422 (e.g., a solid state storage device, a nonvolatile memory device, and/or an optical disk drive that can read or write from removable media such as a CD-ROM disc, a DVD, a BD, etc.). The external storage 1416 can be facilitated by a network virtual machine. The HDD 1414, external storage device(s) 1416 and storage device (e.g., drive) 1420 can be connected to the system bus 1408 by an HDD interface 1424, an external storage interface 1426 and a drive interface 1428, respectively.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1494 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are examples and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
at least one processor; and
at least one memory that stores executable instructions that, when executed by the at least one processor, facilitate performance of operations, the operations comprising:
maintaining an interval group data structure comprising subscription identifiers grouped as subscription identifier interval data, wherein the interval group data structure is adapted to store at least one interval group of subscription identifiers;
receiving a request for a subscription identifier to associate with an entity;
selecting the subscription identifier from the interval group data structure, wherein the selecting of the subscription identifier from the interval group data structure comprises selecting a lowest-valued subscription identifier of a lowest interval group of the interval group data structure, resulting in a selected subscription identifier;
in response to the lowest-valued subscription identifier being determined not to be the only subscription identifier of the lowest interval group, replacing the selected subscription identifier with a next lowest-valued subscription identifier of the lowest interval group; and
in response to the request, associating the selected subscription identifier with the entity to facilitate association of incoming data with the entity.

2. The system of claim 1, wherein the incoming data comprises radio access network data, and wherein the entity comprises an extended application (xApp) deployed in a radio access network intelligent controller.

3. The system of claim 1, wherein the replacing of the selected subscription identifier comprises, in response to determining that the lowest-valued subscription identifier is the only subscription identifier of the lowest interval group, removing the lowest interval group from the interval group data structure.

4. The system of claim 1, wherein the operations further comprise:
obtaining an indication that the subscription identifier was released from the association, and
in response to the obtaining of the indication, modifying the interval group data structure to contain the subscription identifier.

5. The system of claim 4, wherein the modifying of the interval group data structure to contain the subscription identifier comprises creating, in the interval group data structure, a new interval group that contains the subscription identifier.

6. The system of claim 5, wherein the operations further comprise:
determining that the new interval group is adjacent to an existing interval group, and
in response to the determining, merging the new interval group with the existing interval group into a merged interval group of the interval group data structure.

7. The system of claim 4, wherein the modifying of the interval group data structure to contain the subscription identifier comprises:
locating an existing interval group in the interval group data structure that has an adjacent value to a value of the subscription identifier, and changing the adjacent value to the value of the subscription identifier to produce a changed existing interval group in the interval group data structure.

8. The system of claim 7, wherein the operations further comprise:

determining that the changed existing interval group is adjacent to another existing interval group, and in response to the determining, merging the changed existing interval group with the other existing interval group into a merged interval group of the interval group data structure.

9. A method, comprising:

maintaining, by a system comprising at least one processor, an interval group data structure comprising subscription identifiers within one or more interval groups of subscription identifiers;

receiving, by the system, a request for a subscription identifier;

selecting, by the system, the subscription identifier from the interval group data structure, wherein the selecting of the subscription identifier from the interval group data structure comprises selecting a lowest-valued subscription identifier of a lowest interval group of the interval group data structure, resulting in a selected subscription identifier;

based on the lowest-valued subscription identifier being determined not to be the only subscription identifier of the lowest interval group, replacing, by the system, the selected subscription identifier a next lowest-valued subscription identifier of the lowest interval group; and to facilitate association of an entity with the subscription identifier, returning, by the system in response to the request, the selected subscription identifier.

10. The method of claim 9, wherein the modifying of the selected interval group to no longer contain the subscription identifier comprises changing a first value of the subscription identifier of the selected interval group to a second value that is different from the first value.

11. The method of claim 9, wherein the replacing of the selected subscription identifier comprises, in response to determining that the lowest-valued subscription identifier is the only subscription identifier of the lowest interval group, removing the lowest interval group from the interval group data structure.

12. The method of claim 9, further comprising:

obtaining, by the system, an indication that the subscription identifier is to be released; and in response to the obtaining of the indication, releasing, by the system, the subscription identifier, by modifying the interval group data structure to contain the subscription identifier.

13. The method of claim 12, wherein the modifying of the interval group data structure to contain the subscription identifier comprises:

determining whether the subscription identifier is adjacent to an existing interval group, in response to determining that the subscription identifier is adjacent to the existing interval group, modifying the existing interval group to comprise the subscription identifier, and in response to determining that the subscription identifier is not adjacent to the existing interval group, creating a new interval group in the interval group data structure that comprises the subscription identifier.

14. The method of claim 13, wherein the interval group that comprises the subscription identifier comprises a first interval group, and wherein the method further comprises:

determining, by the system, that the first interval group is adjacent a second interval group, and in response to the determining, merging, by the system, the first interval group with the second interval group, resulting in a merged interval group of the interval group data structure.

15. A non-transitory machine-readable medium comprising executable instructions that, when executed by at least one processor of a computer system, facilitate performance of operations, the operations comprising:

maintaining an interval group data structure comprising subscription identifiers grouped as one or more interval groups;

receiving a request for a subscription identifier to associate with an entity;

selecting the subscription identifier from the interval group data structure, wherein the selecting of the subscription identifier from the interval group data structure comprises selecting a lowest-valued subscription identifier of a lowest interval group of the interval group data structure, resulting in a selected subscription identifier;

removing the selected subscription identifier from an interval group of the interval group data structure;

associating the selected subscription identifier with the entity in response to the request, to facilitate relating incoming data with the entity via the selected subscription identifier.

16. The non-transitory machine-readable medium of claim 15, wherein the removing of the selected subscription identifier from the interval group comprises:

determining whether the selected subscription identifier was the only subscription identifier of the interval group, in response to determining that the selected subscription identifier was the only subscription identifier of the interval group, removing the interval group from the interval group data structure, and in response to determining that the selected subscription identifier was not the only subscription identifier of the interval group, modifying the interval group to no longer contain the selected subscription identifier.

17. The non-transitory machine-readable medium of claim 15, wherein the modifying of the interval group data structure to contain the selected subscription identifier comprises:

determining whether the selected subscription identifier is adjacent to an existing interval group, in response to the determining that the selected subscription identifier is adjacent to the existing interval group, modifying the existing interval group to contain the selected subscription identifier, and in response to the determining that the selected subscription identifier is not adjacent to the existing interval group, creating a new interval group in the interval group data structure that contains the selected subscription identifier.

18. The non-transitory machine-readable medium of claim 15, wherein the modifying of the interval group data structure to contain the selected subscription identifier comprises:

modifying an existing interval group into a first interval group that contains the selected subscription identifier, wherein the operations further comprise determining that the first interval group is adjacent a second interval group, and in response to the determining that the first interval group is adjacent to the second interval group, merging the first interval group with the second interval group into a merged interval group of the interval group data structure.

19. The non-transitory machine-readable medium of claim 15, wherein the operations further comprise:

obtaining a release indication indicating that the selected subscription identifier is no longer to be associated with the entity; and in response to the obtaining of the release indication, modifying the interval group data structure to contain the selected subscription identifier.

20. The non-transitory machine-readable medium of claim 19, wherein the modifying of the interval group data structure to contain the subscription identifier comprises:

determining whether the subscription identifier is adjacent to an existing interval group, in response to determining that the subscription identifier is adjacent to the existing interval group, modifying the existing interval group to comprise the subscription identifier, and in response to determining that the subscription identifier is not adjacent to the existing interval group, creating a new interval group in the interval group data structure that comprises the subscription identifier.

* * * * *